3,040,069
PROCESS FOR THE PREPARATION OF 17α-HY-
DROXY-16β-METHYL - 20 - KETO STEROIDS
OF THE 5α-SERIES
Gordon Hanley Phillipps and William Graham, Green-
ford, Gordon Ian Gregory, Chalfont St. Peter, and
Joseph Elks, Golders Green, London, England, assign-
ors to Glaxo Laboratories Limited, Greenford, Eng-
land, a British company
No Drawing. Filed July 18, 1960, Ser. No. 43,286
Claims priority, application Great Britain July 20, 1959
14 Claims. (Cl. 260—397.45)

This invention is concerned with improvements in or relating to the preparation of steroid compounds, and, more particularly, with the preparation of 16β-methyl steroid compounds possessing anti-inflammatory and/or adrenocortical activity, analogues thereof and intermediates therefor.

Various steroids having a methyl group in the α- or β-configuration in the 16-position have been described as having important pharmacological properties, and, in general, are said to possess more pronounced anti-inflammatory properties and less undesirable side effects than the corresponding steroids not possessing the 16-methyl group. The preparation of such compounds has hence become of importance.

The preparation of 16-methyl steroids from 11-keto steroids of the 5β-pregnane series has been described. However, some substances readily available and hitherto used as starting materials for the manufacture of adrenocortical hormones are members of the 5α-series, an important example of such a substance being hecogenin.

It is thus a general object of the present invention to provide a convenient process for the production of steroids of the 5α-series, characterised by possessing a 17α-hydroxy-16β-methyl-20-keto structure, from corresponding steroids of the 5α-series possessing a 16-methyl-16-en-20-keto structure. The production of corresponding compounds in which the methyl group at position 16 has the α- configuration is the subject of copending application No. 43,290 of even date herewith.

Steroid compounds of the 5α-pregnane series possessing a 16-methyl-16-en-20-keto structure can be prepared from raw materials such as hecogenin in various known ways dependent on the nature of the remaining portions of the molecule. Thus, for example, hecogenin acetate can be converted in several steps to form 3β-acyloxy-5α-pregna-9(11):16-dien-20-ones (cf. Djerassi et al., J. Org. Chem. 1951, 16, 1278, and Callow and James J.C.S. 1956, 4739) which can be converted to 3β-acyloxy-16-methyl-5α-pregna-9(11):16-dien-20-ones, for example by the methods described in application No. 43,095, filed July 15, 1960. These last-mentioned intermediates are analogous to intermediates hitherto used in the synthesis of anti-inflammatory compounds. Other similar intermediates in the 5α-pregnane series containing 16-methyl-20-keto structures are the corresponding 9:11-dichloro compounds and the corresponding compounds containing a saturated Ring C and an oxygen function at position 11. It is hence a specific object of the present invention to provide a means of introducing 17α-hydroxy groups in intermediates of the kind just mentioned of the 5α-pregnane series.

In principle, the process of the present invention involves rearrangement of a 16:17-epoxy-16β-methyl-20-keto steroid (which can readily be obtained by epoxidation of a Δ16-steroid) followed by hydrogenation of the product to a 17α-hydroxy-16β-methyl-20-keto compound.

The 17α-hydroxy-16β-methyl-20-keto products according to the invention can be converted into compounds having anti-inflammatory and/or adrenocortical activity in various ways and procedures for such conversions are now well-known. Thus, for example, from the products according to the invention, one can prepare the 16β-methyl analogues of cortisone, hydrocortisone, prednisone, prednisolone, the 9-halogen derivatives of such compounds, 9:11-dichloro-11-desoxyprednisolone and so on. As will be seen, the preparation of such compounds from the products according to the invention may require the formation of a 3-keto group, introduction of unsaturation in Ring A, the introduction of the desired substituent(s) in Ring C and the introduction of a hydroxy (or acyloxy) group at position 21, all of which steps can in principle be carried out by procedures hitherto used in the production of anti-inflammatory and/or adrenocortical hormones. For example, a compound of particular interest is 16β-methyl-9α-fluoro-prednisolone acetate which can be prepared from a 3β-acyloxy-17α-hydroxy-16β-methyl-5α-pregna-9(11)-en-20-one by hydrolysis of the 3-acyloxy group, bromination followed by acetoxylation at the 21-position, formation of the 3-keto group, dibromination and dehydrobrominating in Ring A to give a Δ1,4 structure, epoxidising the 9(11)-double bond and then reacting the 9,11-epoxy grouping with hydrogen fluoride to form 16β-methyl-9α-fluoro-prednisolone acetate. If desired in any or all of the reactions of this sequence up to and including formation of the 3-keto group, the double bond at the 9(11)-position can be protected by dichlorination, the chlorine atoms being subsequently removed, e.g. by hydrogenation.

We have found, according to the invention, that rearrangement of 16:17-epoxy-16β-methyl-20-keto steroids of the 5α-series by means of an acid catalyst gives rise to either a 16-methylene compound or a Δ15-compound (or mixtures thereof) according to the conditions of rearrangement and that hydrogenation of either of such compounds in the presence of certain catalysts gives rise to products containing a substantial proportion of 16β-methyl compounds. As an important features of the invention we found further that, for the production of products containing comparatively high proportions of 16β-methyl compounds as against 16α-methyl compounds, it is desirable to carry out the rearrangement of the epoxide under such conditions (hereinafter described) that a product is obtained consisting of as high a proportion of 16-methylene compound as possible. In other words hydrogenation under the conditions hereinafter set forth of the product of rearrangement of the epoxide gives one a product which whilst consisting essentially of a 16β-methyl compound may contain some 16α-methyl compound; the proportion of the 16α-methyl compound in the product can however in general be kept low by so conducting the rearrangement that the product thereof is a 16-methylene compound.

According to the invention, therefore, there is provided a process for the preparation of 17α-hydroxy-16β-methyl-20-keto steroids of the 5α-series in which a 16:17-epoxy-16β-methyl-20-keto steroid of the 5α-series is subjected to rearrangement in a solvent medium in the presence of an acid catalyst to form a product comprising a 16-methylene or a Δ15-steroid or a mixture thereof which product is then hydrogenated in the presence of a platinum hydrogenation catalyst or a Raney nickel catalyst to yield a product containing a 17α-hydroxy-16β-methyl-20-keto steroid.

According to a further feature of the invention the 16:17-epoxy compound is subjected to rearrangement in a solvent medium of low ionising power i.e. a medium in which the acid catalyst is not freely ionised.

In the process of the invention, therefore, to obtain essentially 16β-methyl compounds as distinct from 16α-methyl compounds it thus is firstly essential that the hydrogenation step be conducted in the presence of a platinum hydrogenation catalyst or a Raney nickel catalyst, palladium catalysts in general leading to products containing a major proportion of 16α-methyl compounds, and secondly it is preferable to conduct the rearrangement so that the product thereof is substantially a 16-methylene compound.

The process of the invention can be illustrated diagrammatically as follows, Ring D only of the molecule being illustrated:

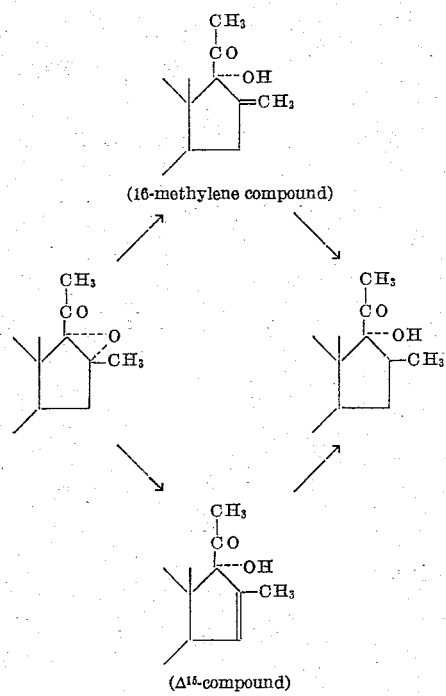

(16-methylene compound)

(Δ15-compound)

The process of the invention will now be described in greater detail:

1. PREPARATION OF 16:17-EPOXY-16β-METHYL-20-KETO COMPOUNDS OF THE 5α-SERIES FROM THE CORRESPONDING Δ16-COMPOUNDS

This reaction is similar to the process described in British specification No. 805,497 and involves epoxidation with hydrogen peroxide under alkaline conditions, e.g. in the presence of sodium hydroxide. This reaction is in general selective to double bonds conjugated with a keto group and hence will not in general cause epoxidation of non-conjugated double bonds present elsewhere in the molecule, e.g. at the 9(11)-position.

Representative compounds obtained in this step and useful as starting material for the rearrangement stage, are for example compounds of the general formula

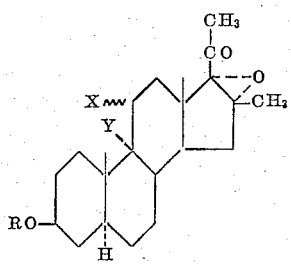

(where R=hydrogen or an acyl group, X is a keto, acyloxy, hydroxy or halogen group, Y is hydrogen or halogen or X and Y together signify a carbon-carbon bond (giving a Δ9(11) compound)).

It should be noted that where a compound of this formula is required in which X and Y are both halogen, it is preferable first to epoxidise the corresponding Δ9(11),16-compound and subject the resultant Δ(9)11-16:17-epoxide to halogenation, since 9:11-dihalo compounds tend to be unstable to the conditions used to epoxidise the Δ16-double bond.

For similar reasons, compounds in which X is an acyloxy group or a hydroxy group and Y is halogen are also best obtained by epoxidation of a Δ9(11),16 compound followed by addition of the elements of AcOHal across the double bond, e.g. by the methods described by Robinson et al., J.A.C.S., 1959, 81, 2195 and Fried et al., J.A.C.S., 1957, 79, 1130.

2. REARRANGEMENT OF THE 16:17-EPOXY COMPOUND

In principle, this rearrangement involves treatment of the 16:17-epoxide in a solvent medium with an acid catalyst, which is preferably a strong or moderately strong acid. Suitable acids are, for example, hydrogen bromide, hydrogen chloride, sulphuric acid, perchloric acid or formic acid. Mineral acids are generally to be preferred.

We find that where the rearrangement is carried out in the presence of a solvent medium of low ionising power a product is obtained on rearrangement which tends to have a high proportion of 16-methylene compound. By the term solvent medium of low ionising power, we means such media wherein the acid catalyst is not freely ionised. Preferred solvents for this purpose are the ethers, e.g. diethyl ether, di-isopropyl ether, especially the cyclic ethers, such as dioxan, tetrahydrofuran, etc. Where the rearrangement is carried out in other media of stronger ionising power, e.g. acetic acid, products containing lesser proportions of 16-methylene compound are in general obtained.

Where the medium is one of compartively strong ionising power i.e. one in which the acid used can freely ionise, the product of the rearrangement is in general substantially the Δ15-compound. Such media include media consisting of or containing hydroxylic solvents e.g. methanol or ethanol as well as aqueous media.

In general, hydrogen bromide is the preferred acid for effecting the rearrangement as it appears to provide the most constant results of acids so far examined. The reaction is conveniently carried out at temperatures of between 15–30° C. The course of the reaction is best followed by observation of the change in specific rotation of the reaction mixture since the rotation of the desired product is in general, lower than that of the starting epoxide or any side products.

If the product of the rearrangement is a mixture of Δ15- and 16-methylene compound this can be separated e.g. by fractional crystallisation.

16-methylene compounds can be conveniently distinguished from Δ15-compounds by comparison of infrared spectra. In particular the 16-methylene compounds possess a marked band at about 910 cm.$^{-1}$.

3. HYDROGENATION OF THE PRODUCT OF THE REARRANGEMENT STAGE 2 TO A 16-METHYL COMPOUND

As stated above the hydrogenation according to the invention must be carried out in the presence of a platinum catalyst or a Raney nickel catalyst. The platinum catalyst may be platinum metal or a supported platinum catalyst e.g., platinised charcoal or platinised silica. Raney nickel catalysts prepared in a conventional manner can be used. Where a platinum catalyst is used the hydrogenation is preferably conducted under neutral or slightly acidic conditions, and with Raney nickel, neutral or basic conditions are preferred. Suitable solvent media for the hydrogenation are for example, tetrahydrofuran, dioxan, ethanol, iso-propanol, t-butanol, ethyl acetate, etc. The hydrogenation is further conveniently effected at atmospheric temperature and pressure.

It may be noted that where the steroid contains halogen in the 9- and 17-position, the use of Raney nickel, or platinum with basic condition may result in dehalogenating to a Δ9(11) structure.

Where the hydrogenation product contains some 16α-methyl compound, separation may be effected as desired, e.g. by repeated crystallisation. It is sometimes found that slight modification of the molecule may facilitate this separation.

Thus, for example, it is difficult to purify completely 3β,17α-dihydroxy-16β-methyl-5α-pregn - 9(11)-en-20-one or its 3-acetate when they are accompanied by minor quantities of the 16α-epimers, although repeated crystallisation from pyridine will purify the acetate. However, conversion to the corresponding 3β,17α-dihydroxy-9,11-dichloro compounds gives a mixture from which the pure 16β-methyl compound is obtained by crystallisation without difficulty.

16α-compounds may be distinguished from 16β-compounds in various ways, for example by differences in specific rotation, infra-red spectra and paper chromatography. Thus in general the specific rotation of a 16β-compound is more positive than that of the corresponding 16α-epimer; in paper chromatography a 16α-compound generally moves faster than the corresponding 16β-epimer.

In order that the invention may be well understood, the following examples are given by way of illustration only:

*Example 1*

(A) PREPARATION OF 3β-ACETOXY-16β-METHYL-16α:17α-EPOXY-5α-PREGN-9(11)-EN-20-ONE

3β-acetoxy-16-methyl-5α-pregna-9(11):16-dien - 20-one (70 g.) was dissolved in a mixture of methanol (2.8 litres) and methylene chloride (350 ml.). 100 vol. hydrogen peroxide (210 ml.) was added, followed by water (450 ml.) and 5 N aqueous sodium hydroxide solution (140 ml.) and the mixture was stirred overnight at room temperature. A solid had precipitated by the end of the reaction period and the suspension was poured into water (5.0 litres) and extracted with methylene chloride (4×750 ml.). The extracts were bulked, washed with water (4×1.0 l.) and the solvent distilled off. The white solid residue was dissolved in pyridine (70 ml.) and acetic anhydride (70 ml.) and heated for 0.5 hour, on the steambath. Water (250 ml.) was added and the product filtered off, washed with water (4×100 ml.) and dried at 100° in vacuo for 4 hours to yield 3β-acetoxy-16β-methyl-16α:17α-epoxy-5α-pregn-9(11)-en-20-one (70 g.), M.P. 165–167°. The epoxide was recrystallised from methanol (1,700 ml.) filtered off, washed with a little methanol and dried at 100°, in vacuo.

Weight=61 g. (83% yield), M.P. 169–172° and $[\alpha]_D=+65.5°$ (c, 1 in $CHCl_3$).

(B) REARRANGEMENT OF 3β-ACETOXY-16β-METHYL-16α:17α-EPOXY-5α-PREGN-9(11)-EN-20-ONE

3β-acetoxy-16β - methyl - 16α:17α - epoxy - 5α - pregn-9(11)-en-20-one (5 g.) in acetic acid (110 ml.) was treated, with stirring, at room temperature, with 3.1% w/v hydrogen bromide in acetic acid (3.55 ml.). The mixture was stirred for 10 min. until the yellow colour developed and then anhydrous potassium acetate (0.15 g.) was added to discharge the colour and stop the reaction. The precipitated solid was filtered off, washed with water and dried in vacuo at 100°.

Wt.=1.8 g. (36%), M.P. 180–182°, $[\alpha]_D$ —69° (c, 1 in $CHCl_3$). The filtrate was concentrated under reduced pressure until solid began to precipitate. The mixture was allowed to stand at room temperature for 2 hours, isolated by filtration, washed with dilute acetic acid, water and then dried at 100° in vacuo.

Wt.=1.9 g. (38%), M.P. 178–181°, $[\alpha]_D$ —68.5° (c, 1 in $CHCl_3$).

The filtrate was diluted with water (200 ml.) extracted with methylene chloride (4×25 ml.) and the organic layers bulked, washed with water (1×50 ml.), saturated sodium bicarbonate solution (1×50 ml.) and water (1×50 ml.). The solvent was evaporated at reduced pressure and the residue recrystallised from petroleum ether (B.P. 100–120°).

Wt.=0.36 g., M.P. (166) 175–180°, $[\alpha]_D$ —60° (c, 1 in $CHCl_3$). The product contained about 40% of the 16-methylene compound and 60% of the 16-methyl-$\Delta^{15}$ compound.

*Example 2*

3β-acetoxy-16β - methyl - 16α:17α - epoxy - 5α - pregn-9(11)-en-20-one (1.0 g.) was treated as in Example 1(b) but with 56% aqueous hydriodic acid (0.04 ml.) instead of hydrobromic acid. The same product (0.56 g.) M.P. 180–182°, $[\alpha]_D=-63°$ (c, 1 in $CHCl_3$) was isolated.

*Example 3*

3β-acetoxy - 16β - methyl-16α:17α - epoxy - 5α - pregn-9(11)-en-20-one was treated with 4.02% w/v hydrochloric acid in acetic acid as above in Example 1(b) and this gave the same product (0.61 g.) M.P. 178–180°, $[\alpha]_D$ —68° (c, 1 in $CHCl_3$).

*Example 4*

3β-acetoxy - 16β - methyl-16α:17α - epoxy - 5α - pregn-9(11)-en-20-one (0.94 g.) in methylene chloride (10 ml.) was treated with 50% aqueous hydrobromic acid (10 ml.) at room temperature for 1 hour and gave a product (0.55 g.), M.P. 178–182°, $[\alpha]_D$ —70° (c, 1 in $CHCl_3$) believed to contain about 60% of the 16-methyl-$\Delta^{15}$ compound.

*Example 5*

3β-acetoxy - 16β - methyl-16α:17α - epoxy - 5α - pregn-9(11)-en-20-one (0.5 g.) in acetic acid (11 ml.) was treated with N sulphuric acid (1 ml.) and allowed to stand at room temperature for 1½ hours. The product (0.3 g.) was isolated on working up—M.P. 178–181°, $[\alpha]_D$ —67° (c, 1 in $CHCl_3$) and contained about 70% of 16-methyl-$\Delta^{15}$-compound.

*Example 6*

3β-acetoxy-16β-methyl - 16α:17α - epoxy - 5α - pregn-9(11)-en-20-one (0.5 g.) was dissolved in acetic acid (20 ml.) containing 2 drops of perchloric acid. The reaction was followed polarimetrically:

| Time (mins.): | $\alpha_D$, ° |
|---|---|
| 0 | +1.5 |
| 1 | +0.9 |
| 3 | +0.79 |
| 6 | +0.98 |
| 8 | +1.13 |
| 11 | +1.27 |
| 15 | +1.42 |
| 18 | +1.52 |
| 20 | +1.58 |
| 23 | +1.62 |

The reaction was stopped by the addition of anhydrous potassium acetate and worked up in the same manner to yield a product (0.15 g.) having M.P. 180–182°, $[\alpha]_D$ —71° (c, 1 in $CHCl_3$).

*Example 7*

When 3β-acetoxy-16β-methyl-16α:17α-epoxy-5α-pregn-9(11)-en-20-one (0.5 g.) was shaken at room temperature for 4 hours in a two-phase system consisting of benzene (10 ml.), water (10 ml.) and formic acid (0.2 ml.), unchanged starting material was recovered. When a benzene (10 ml.) and formic acid (1.0 ml.) mixture was used a mixture of starting material containing some of the rearrangement product was formed as indicated by the rotation ($[\alpha]_D=+50°$). When, however, this mixture was boiled for 2.5 hours, complete rearrangement occurred as shown by the constants of the final product: M.P. 180–183°, $[\alpha]_D$ —76° (c, 1 in $CHCl_3$). The product contained about 70% of the 16-methylene compound.

*Example 8*

(A) 3β-ACETOXY-17α-HYDROXY-16-METHYLENE-5α-PREGN-9(11)-EN-20-ONE

3β - acetoxy - 16α:17α-epoxy - 16β - methyl-5α-pregn-

9(11)-en-20-one (6.0 g.) in solution in pure dioxan (50 ml.) was treated at room temperature with a 2.2% (w/v) solution of hydrogen bromide in acetic acid (1.0 ml.). The specific rotation of the steroid fell from $[\alpha]_D$ +63° and became steady at $[\alpha]_D$ —36° in 12 minutes. Crystals began to separate after 13 minutes and after 15 minutes the suspension was diluted with water to 400 ml. The crystalline product (5.9 g.), M.P. 178–180°, $[\alpha]$ —80° (c, 1.4 in $CHCl_3$), was filtered off, washed with water and dried at 0.1 mm./100° C. for 3.5 hours. Crystallisation of the crude product (4.0 g.) from ethyl acetate (20 ml.) gave the 16-methylene-compound (2.89 g.) as needles, M.P. 181–182°, $[\alpha]_D$ —81° (c, 1.15 in $CHCl_3$). (Found: C, 74.8; H, 8.9. $C_{24}H_{34}O_4$ requires C, 74.7, H, 8.9%.) Other similar experiments were carried out as in the following table.

| Steroid Concentration, percent | AcOH percent conc. in dioxan | Percent HBr (w/v) | Time, min. | Percent Yield | $[\alpha]_D$ $CHCl_3$, degrees |
|---|---|---|---|---|---|
| 11.8 | 1.96 | 0.043 | 15 | 98.5 | —80 |
| 11.8 | 0.08 | 0.043 | 50 | 93.5 | —80 |
| 9.85 | 1.58 | 0.035 | 17 | 98.1 | —79 |
| 11.9 | 0 | 0.047 | 15 | 93.1 | —78 |
| 1.9 | 3.85 | 0.085 | 12 | 90.0 | —80 |
| 1.96 | 1.96 | 0.043 | 36 | 93.0 | —79.5 |

(B) 3-β-ACETOXY-17α-HYDROXY-16β-METHYL-5α-PREGN-9(11)-EN-20-ONE

3β - acetoxy - 17α - hydroxy - 16 - methylene-5α-pregn-9(11)-en-20-one (3.0 g.) in absolute ethanol (50 ml.) was added to a suspension of Adams' platinum catalyst (193 mg.) which had been pre-reduced in absolute ethanol (100 ml). The mixture was shaken under hydrogen, when 1 mole of hydrogen was absorbed in 25 min. The reduction was stopped at 50 min., when 1.04 moles had been absorbed, and the catalyst was removed by filtration through kieselguhr. Evaporation of the filtrate to dryness in vacuo left a residue (2.99), consisting essentially of the 16β-methyl-compound, as plates, $[\alpha]_D$ +30.3° (c, 2.77 in dioxan). This material contained 5–10% of the 16α-epimer. Successive crystallisations of the hydrogenation product (1.9) from 95% aqueous methanol, methanol and pyridine (twice) gave 3β-acetoxy-17α-hydroxy-16β-methyl - 5α - pregn-9(11)-en-20-one (760 mg.), $[\alpha]_D$ +33° (c, 2.75 in dioxan). This material contained less than 5% of the 16α-isomer.

Example 9

3β-ACETOXY-17α-HYDROXY-16-METHYLENE-5α-PREGNANE-11,20-DIONE

3β - acetoxy - 16α:17α - epoxy - 16β - methyl-5α-pregnane-11,20-dione (500 mg.) in pure dioxan (25 ml.) was treated at room temperature with a 2.2% solution of hydrogen bromide in acetic acid (1.0 ml.). The specific rotation of the steroid fell from +65° and became steady at +2° in 40–45 minutes. After 50 min. the solution was poured into water (170 ml.) and the precipitated product (450 mg.), $[\alpha]_D$ —25° (c, 1.4 in $CHCl_3$) was collected by filtration and washed with water, and dried. Crystallisation from acetone-hexane, gave the 16-methylene compound (174 mg.) M.P. 187–189° $[\alpha]_D$ —42° (c, 1.28 in $CHCl_3$). (Found C, 71.1; H, 8.5, $C_{24}H_{34}O_5$ requires C, 71.6; H, 8.5%.)

Example 10

3β-ACETOXY-9α : 11β-DICHLORO-16α : 17α-EPOXY-16β-METHYL-5α-PREGNAN-20-ONE

3β-acetoxy-16β - methyl - 16α:17α - epoxy - 5α - pregn-9(11)-en-20-one (2.8 g.) in chloroform (60 ml.) was treated with a solution of chlorine (0.44 g., 1 equiv.) in carbon tetrachloride (11.2 ml.). The yellow colour was discharged immediately. After standing for 10 min. the solution was washed successively with dilute aqueous sodium thiosulphate and water. The organic solution was dried ($MgSO_4$) and the solvent was removed to leave a pale yellow crystalline solid (3.28 g., 99%), M.P. 184–188°. Crystallisation from acetone gave 3β-acetoxy-9α:11β-dichloro-16α:17α-epoxy-16β-methyl - 5α-pregnan-20-one (3.02 g., 91%), M.P. 193–195° (Kof.), $[\alpha]_D$ +58° (c, 1.2 in $CHCl_3$). (Found: C, 63.06; H, 7.64; Cl, 15.65; $C_{24}H_{34}O_4Cl_2$ requires C, 62.96; H, 7.5; Cl, 15.5%.)

Example 11

PREPARATION OF 3β-ACETOXY-9α : 11β-DICHLORO-17α-HYDROXY-16-METHYLENE-5α-PREGNAN-20-ONE (a) *In dioxan.*—3β-acetoxy-9α:11β-dichloro-16α:17α-epoxy-16β-methyl-5α-pregnan-20-one (500 mg.) in pure dioxan (25 ml.) was treated at room temperature with a 2.2% solution of hydrogen bromide in acetic acid (1.0 ml.). The specific rotation of the steroid fell from +53° and became steady at +0.5° in 35–40 min. After 46 min. the solution was poured into water, and the precipitated product (479 mg.), $[\alpha]_D$ —23.5° (c, 1.0 in $CHCl_3$) was collected by filtration, washed with water, and dried. Crystallisation from acetone-hexane gave the 16-methylene-compound (292 mg.), M.P. 189° (decomp.), $[\alpha]_D$ —29° (c, 1.48 in $CHCl_3$).

(b) *In acetic acid.*—The epoxide (8.9 g.) was dissolved in a mixture of methylene chloride (40 ml.) and glacial acetic acid (340 ml.) and treated with a solution of hydrogen bromide in glacial acetic acid (8.9 ml. of a solution containing 2.2 g. HBr in 100 ml.). The mixture was kept at room temperature until the rotation had fallen to a constant value (ca. 15 min.); the colour of the solution was a greenish-blue. The mixture was poured into a large volume of 1% sodium acetate solution. The product was extracted with methylene chloride, the organic layer was washed successively with water, aqueous sodium bicarbonate and water, dried ($MgSO_4$) and the solvent removed to give a yellow solid. This product was crystallised from acetone-hexane and dried at 80–90° in vacuo furnishing 3β-acetoxy-9α:11β-dichloro-16-methylene-17α-hydroxy-5α-pregnan-20-one (7.4 g., 83%), M.P. 193–195°, $[\alpha]_D$ —34° (c, 0.94 in $CHCl_3$). Found: C, 63.1; H, 7.5; Cl, 15.2. $C_{24}H_{34}O_4Cl_2$ requires C, 63.0; H, 7.5; Cl, 15.5%.)

Example 12

HYDROGENATION AND HYDROGENOLYSIS OF 3β-ACETOXY-9α : 11β-DICHLORO-17α-HYDROXY-16-METHYLENE-5α-PREGNAN-20-ONE

The title compound prepared as in Example 11(b) above: (457 mg., 1 m. mole) in tetrahydrofuran (15 ml., freshly distilled, peroxide free) was added to a pre-reduced suspension of Adams' platinum oxide (50 mg.) in tetrahydrofuran (30 ml.). Reduction, initially rapid, slowed down and was complete after 2.5 hr. Total uptake of hydrogen was 35 ml. The catalyst was removed by filtration and the filtrate was added to a pre-reduced suspension of 10% palladium on charcoal (100 mg.) in tetrahydrofuran (10 ml.) containing triethylamine (0.42 ml., 3 equivs.). Hydrogenolysis proceeded rapidly and stopped when 20.4 ml. of hydrogen had been used in 90 min. The catalyst was filtered off and the product was isolated by pouring the filtrate into water. The white solid (340 mg.) was washed and thoroughly dried, $[\alpha]_D$ +24° (c, 1.2 in dioxan). Two crystallisations from methanol gave white needles, M.P. 165–172°, $[\alpha]_D$ +25° (c, 1.0 in dioxan). (Found: C, 74.5; H, 9.1. Calc. for $C_{24}H_{36}O$: C, 74.2; H, 93%.) The product appeared to be a mixture of 16α- and 16β-methyl-3β-acetoxy-17α-hydroxy-5α-pregn-9(11)-en-20-one which could not be separated.

An alternative method for removing the chlorine atoms from the hydrogenation product involved the use of chromous chloride. The hydrogenation product (440 mg. from a $PtO_2$/EtOAc reduction) in acetone (20 ml.) was treated (with swirling and under nitrogen) with chromous chloride solution (5 ml., ca. 1 N). After 15 min. the reaction mixture was poured into a dilute solution of sodium bicarbonate. The solid was filtered off, and dissolved in ethyl acetate. The organic layer was washed with water and dried (MgSO₄). Removal of the solvent left a white solid (330 mg.), $[\alpha]_D$ +25° (dioxan). Crystallisation from methanol furnished white needles, M.P. 168–174°, $[\alpha]_D$ +25° (c, 0.62 in dioxan) which resembled the product obtained by hydrogenolysis as described above.

*Example 13*

(A) 3β-HYDROXY-16-METHYL-5α-PREGNA-9(11),16-DIEN-20-ONE

3β-acetoxy-16-methyl-5α-pregna-9(11),16-dien-20-one (1.07 g.), dissolved in the minimum of cold methylene chloride (ca. 6 ml.), was stirred at room temperature for 16 hours with methanolic perchloric acid (0.27 N, 70 ml.). The reaction mixture was poured into water (500 ml.), the precipitated solid filtered off, washed well with water and dried. The crude product (980 mg.) was crystallised from acetone to furnish 3β-hydroxy-16-methyl-5α-pregna-9(11),16-dien-20-one (750 mg.), M.P. 198–199°, $[\alpha]_D$ +59° (c, 1.0 in CHCl₃). (Found: C, 80.4; H, 9.7%. $C_{22}H_{32}O_2$ requires C, 80.4; H, 9.8%.)

(B) 16α:17α-EPOXY-3β-HYDROXY-16β-METHYL-5α-PREGN-9(11)-EN-20-ONE (i) To a solution of 3β-hydroxy-16-methyl-5α-pregna-9(11),16-dien-20-one (5 g.) in methylene chloride (37 ml.), methanol (200 ml.) and water (40 ml.) was added hydrogen peroxide (100 vol., 15 ml.) followed by aqueous sodium hydroxide (2.5 N, 20 ml.). The reaction mixture was stirred at room temperature for 16 hours during which time some solid material separated out. The total reaction mixture was poured into water and extracted with methylene chloride. The organic extracts were repeatedly washed with water, until free of both alkali and peroxide, dried (MgSO₄) and evaporated to dryness. The residue (5.25 g.) was crystallised from acetone-n-hexane to furnish 16α:17α-epoxy-3β-hydroxy-16β-methyl-5α-pregn-9(11)-en-20-one (3.64 g.), M.P. 173–174°, $[\alpha]_D$ +76° (c, 1.0 in CHCl₃). The mother liquors furnished a second crop (0.45 g.) M.P. 172–173°, $[\alpha]_D$ +75° (CHCl₃).

(ii) 3β-acetoxy-16-methyl-5α-pregna-9(11),16-dien-20-one (10.5 g.) dissolved in methylene chloride (100 ml.), methanol (800 ml.) and water (160 ml.) was treated, as above, with hydrogen peroxide (100 vol., 60 ml.) and aqueous sodium hydroxide (2.5 N, 80 ml.) at room temperature for 16 hours. Working up, as above, and crystallisation from acetone-n-hexane gave 16α:17α-epoxy-3β - hydroxy - 16β - methyl - 5α - pregn - 9(11) - en-20-one (7.7 g.,) M.P. 171–173°, $[\alpha]_D$ +75° (c, 0.95 in CHCl₃).

(C) 3β:17α-DIHYDROXY-16-METHYLENE-5α-PREGN-9(11)-EN-20-ONE

A solution of hydrogen bromide in acetic acid (2.2% w/v: 5 ml.) was added to a solution of 16α:17α-epoxy-3β - hydroxy - 16β - methyl - 5α - pregn - 9(11) - en-20-one (5 g.) in redistilled dioxan (250 ml.). A portion was removed from the reaction mixture and its rotation was followed. After 10 minutes the rotation reached a constant value and did not change during a further 10 minutes. The total reaction mixture was then poured into dilute sodium acetate solution, the precipitated solid was filtered off, washed with water and dried. Crystallisation of the crude product (4.7 g.) from chloroform gave 3β:17α - dihydroxy - 16 - methylene - 5α - pregn-9(11)-en-20-one (3.12 g.) M.P. 238–240°, $[\alpha]_D$ −93.5° (c, 0.95 in CHCl₃). (Found: C, 76.3; H, 9.5%. $C_{22}H_{32}O_3$ requires C, 76.7; H, 9.4%.) The mother liquors furnished a second crop (1.07 g.), M.P. 237–240°, $[\alpha]_D$ −92.5°.

(D) HYDROGENATION OF 3β:17α-DIHYDROXY-16-METHYLENE-5α-PREGN-9(11)-EN-20-ONE

3β:17α - dihydroxy - 16 - methylene - 5α - pregn-9(11)-en-20-one (1 g.) in ethanol (120 ml.) was added to a prereduced suspension of Adams' platinum oxide catalyst (59 mg.) in ethanol (30 ml.) and the mixture was shaken in hydrogen at room temperature and at atmospheric pressure. One mol. equiv. of hydrogen was consumed in 30 minutes. A further 0.1 mol was consumed in a further 30 minutes at which point the hydrogenation was stopped. The catalyst was filtered off and the filtrate evaporated to dryness in vacuo. The total crude product had $[\alpha]_D$ +32.6° (c, 0.85 in dioxan).

(E) 3β-ACETOXY-17α-HYDROXY-16β-METHYL-5α-PREGN-9(11)-EN-20-ONE

The crude product (150 mg. from a hydrogenation similar to the one above) in pyridine (5 ml.) was treated with acetic anhydride (3 ml.) at room temperature for ca. 18 hr. The reaction mixture was poured into water and extracted with methylene chloride. The oragnic extract was washed successively with dilute hydrochloric acid, water, saturated sodium bicarbonate and water, dried (MgSO₄) and evaporated to dryness. Crystallisation of the residue from methanol gave 3β-acetoxy-17α-hydroxy - 16β - methyl - 5α - pregn - 9(11) - en - 20-one (83 mg.) M.P. 174–178° $[\alpha]_D$ +32° (c, 0.7 in dioxan).

(F) 9α:11β-DICHLORO-3β:17α-DIHYDROXY-16β-METHYL-5α-PREGNAN-20-ONE

The crude product (750 mg. from the hydrogenation described in (D) above) in chloroform (110 ml.) was treated with chlorine (1.1 mol. eq.) in carbon tetrachloride (6.25 ml.) at room temperature for 3 minutes. The chloroform solution was washed successively with dilute sodium thiosulphate solution and water, dried (MgSO₄) and evaporated in vacuo. Trituration of the residue with cold acetone gave a white solid which when crystallised from chloroform furnished 9α:11β-dichloro-3β:17α-dihydroxy-16β-methyl-5α-pregnan-20-one (335 mg.), M.P. 201–204°, $[\alpha]_D$ +75° (c, 0.52 in dioxan).

*Example 14*

(A) PREPARATION OF THE 16:17-PYRAZOLINE OF 3β-ACETOXY-5α-PREGN-16-ENE-11:20-DIONE (i) *Use of N:N'-dinitroso-N:N'-dimethylterephthalamide (N.N.P.).*—3β-acetoxy-5α-pregn-16-ene-11:20 dione (200 g.) was dissolved in methylene chloride (3 l.) in a 10 l. three-neck flask fitted with thermometer, dropping funnel, nitrogen inlet and stainless steel stirrer. N.N.P. reagent (200 g.) was added with stirring and the total solution brought to 27°.

40% aqueous sodium hydroxide solution (1.75 l.) was run in over two hours initially maintaining the temperature at 27° then, when reaction set in, cooling to maintain the temperature below 30°. Ice water (4 l.) was added and the resulting two phase mixture stirred while a brisk nitrogen stream was bubbled through to remove excess diazomethane. When the colour of the solution indicated that diazomethane was absent, the two phases were separated and the aqueous phase extracted with methylene chloride (3×400 ml.), the bulked methylene chloride extract washed with water (3×500 ml.) and taken to dryness finally under reduced pressure. The white solid product was broken up under petroleum (B.P. 40–60°, 600 ml.), filtered and dried at 60°/0.1 mm. for 3 hours, yield 191 g., M.P. 176–176.5° dec. $[\alpha]_D$=+111° (c, 1 in CHCl₃).

(ii) *Using N-nitroso-N-methylurea.*—3β-acetoxy-5α-pregn-16-ene-11:20-dione (200 g.) was dissolved in methylene chloride (2 l.) and cooled to 5° in a 5 l. three-necked flask fitted with stirrer, thermometer, nitrogen inlet and dropping funnel. The solution was stirred and cooled to −5° while nitrosomethylurea (130 g. 10% moisture) was added.

Potassium hydroxide (45% solution, 220 ml.) was run in with stirring at such a rate as to keep the temperature between −5° and 0° (ca. 30–45 min.) then the reaction mixture was allowed to warm to 20° over 90 min. and ice water (1.5 l.) added. Nitrogen was bubbled through the reaction mixture until the diazomethane colour was removed. The two layers were separated and worked up as under (A) above. Yield 200.3 g., M.P. 175–178° dec. $[\alpha]_D = +111°$ (c, 1 in $CHCl_3$).

(B) PREPARATION OF 3β-ACETOXY-16-METHYL-5α-PREGN-16-ENE-11:20-DIONE

The 16:17-pyrazoline of 3β-acetoxy-5α-pregn-16-ene-11:20 dione (200 g.) was added to diethylene glycol (660 ml.) maintained at 187°±2° with stirring over 8 minutes. The solution which turned yellow and effervesced during the addition was held at this temperature for a further 10 minutes, cooled rapidly to ca. 90° and diluted carefully with water (1 litre). The suspension was allowed to cool to room temperature overnight and the crystals were collected on a sintered plate, washed thoroughly with water and dried at 100°/0.1 mm. for 4 hours.

This crude product was dissolved in methanol (3.2 l.) and allowed to cool to 0° overnight. The crystals were collected by filtration, washed with ice-cold methanol (300 ml.) and dried at 60°/0.1 mm. for 3 hrs. Yield 116 g., M.P. 169–170° $[\alpha]_D = +25°$ (c, in $CHCl_3$).

(C) 3β-ACETOXY-16α:17α-EPOXY-16β-METHYL-5α-PREGNANE-11:20-DIONE

5 N-sodium hydroxide solution (20 ml.) was added dropwise to a stirred mixture of 3β-acetoxy-16-methyl-5α-pregn-16-ene-11:20 dione (10 g.), methylene chloride (50 ml.), methanol (400 ml.), 100 volume hydrogen peroxide (30 ml.), water (100 ml.). The mixture was stirred at room temperature overnight. Addition of water (750 ml.), extraction with methylene chloride (4×200 ml.) washing the extract with water (4×800 ml.) and removal of the solvent in vacuo gave a crude product (9.2 g.). This was re-acetylated by heating with acetic anhydride (10 ml.) and pyridine (10 ml.) on the steam bath for 30 minutes. The mixture was diluted with water (50 ml.) filtered and solids washed with water (4×20 ml.) and dried at 100° C. in vacuo. The crude product (9.8 g.), M.P. 182–192° C. was recrystallised from industrial alcohol (50 ml.) to give the pure epoxide (7.1 g.) M.P. 192–196° C., $[\alpha]_D + 74°$ (c, 1.075 in $CHCl_3$).

(D) REARRANGEMENT OF 3β-ACETOXY-16α,17α-EPOXY-16β-METHYL-5α-PREGNANE-11,20-DIONE

A 3.1% solution of hydrogen bromide in acetic acid (3.6 ml.) was added to a stirred solution of 3β-acetoxy-16α:17α-epoxy-16β-methyl-5α-pregnane-11:20-dione (5 g.) in acetic acid (100 ml.). After stirring for 15 minutes at room temperature the mixture was decolorised by addition of anhydrous potassium acetate (0.1 g.) and water (150 ml.) was added. After a further 15 minutes stirring the solid product was collected by filtration, washed with water (4×50 ml.) and dried at 100° C. in vacuo. Yield, 3.92 g. (second crop 0.58 g. from the mother liquors). Recrystallisation from cyclohexane gave the product, M.P. 186–188.5° C., $[\alpha]_D -50.9°$ (c, 1.178 in $CHCl_3$).

(E)

(i) *Hydrogenation with platinum oxide catalyst in acetic acid.*—The material obtained according to Example 14(d) (1 g.) was shaken with hydrogen and pre-reduced Adams' platinum oxide catalyst (0.2 g.) in acetic acid (100 ml.). Hydrogenation proceeded rapidly until ca. 1.3 moles of hydrogen had been taken up (60 minutes). The mixture was filtered, evaporated to dryness in vacuo and the residue crystallised from cyclohexane to give 0.67 g., M.P. 160–161° $[\alpha]_D +36.9°$ (c, 1.165 in $CHCl_3$). The infra red spectrum indicated that less than 5% of the carbonyl had been reduced.

(ii) *Platinum oxide catalyst in methanol.*—The material obtained according to Example 14(d) (1 g.) was shaken with pre-reduced platinum oxide catalyst (0.2 g.) and hydrogen, in methanol (100 ml.). Hydrogen was rapidly taken up (ca. 1.3 moles in 45 minutes) and when hydrogenation was complete the mixture was filtered and the solvent removed in vacuo. The residue crystallised from cyclohexane to give 3β-acetoxy-17α-hydroxy-16α-methyl-5α-pregnane-11:20-dione (0.55 g.) M.P. 162° $[\alpha]_D +38.4°$ (c, 1.561 in $CHCl_3$).

*Example 15*

(a) To a solution of 3β-acetoxy-16β-methyl-16α:17α-oxido-5α-pregn-9(11)-en-20-one (20 g.) in tetrahydrofuran (400 ml.) was added 9 N-sulphuric acid (100 ml.). The resulting homogeneous solution was set aside at room temperature for 72 hours, during which time the α° reading of a sample, followed polarimetrically, decreased from +4.61° to −3.1°. Chloroform (600 ml.) and water (400 ml.) were added, the organic phase separated, washed with sodium bicarbonate solution, water and evaporated. The residue was acetylated at 95° for 15 min. with acetic anhydride (40 ml.) and pyridine (40 ml.). The excess of acetic anhydride was decomposed by the addition of a little water and the steroid precipitated by the further addition of water totalling 480 ml. The product was collected, washed with water and dried (19.5 g.), $[\alpha]_D -51.2°$ ($CHCl_3$). Infra-red examination suggested that it contained about 80% of the 16-methyl-15-en and 20% of the 16-methylene compound. The product was recrystallised twice from methanol to give pure 3-acetoxy-17α-hydroxy-16-methyl-5α-pregna-9(11):15-dien-20-one, M.P. 184–188°, $[\alpha]_D^{20} -60°$ ($CHCl_3$).

The foregoing experiment was repeated with different solvent/acid combinations and the results were as follows:

| Acid | Solvent | Product |
| --- | --- | --- |
| HCl | Tetrahydrofuran containing 18% Acetic Acid. | 16 methylene compound. |
| 11 N aqueous HBr | Tetrahydrofuran containing 10% Acetic Acid. | Essentially $\Delta^{15}$ compound. |
| 11 N aqueous HCl | Tetrahydrofuran containing 5% Acetic Acid. | Essentially $\Delta^{15}$ compound. |

*Example 16*

HYDROGENATION OF 3β-ACETOXY-16-METHYLENE-5α-PREGN-9(11)EN-20-ONE TO YIELD THE 16β-METHYL COMPOUND

Freshly prepared Raney nickel (50 g.) was suspended in tetrahydrofuran (200 ml.) and the mixture shaken in hydrogen for 3.5 hours, during which time 370 ml. of hydrogen were absorbed. The 16-methylene compound (5 g.) in tetrahydrofuran (60 ml.) and triethylamine (1.0 ml.) was added to the pre-reduced catalyst and the mxiture shaken in hydrogen overnight. The catalyst was removed by filtration through kieselguhr, washed with tetrahydrofuran, and the combined filtrate and washes concentrated to small bulk and poured into an excess of water. The steroid that precipitated (4.98 g.) was collected, washed with water and dried, and consisted essentially of the 16β-methyl compound $[\alpha]_D ±0°$ (c, 1.0 in $CHCl_3$).

*Example 17*

REARRANGEMENT OF 3β-ACETOXY-16α,17α-EPOXY-16β-METHYL-5α-PREGN-9(11)-EN-20-ONE WITH HYDROGEN BROMIDE IN TETRAHYDROFURAN-ACETIC ACID

The epoxide (600 mg.), in purified tetrahydrofuran (10 ml.), was treated with 2.2% hydrogen bromide in acetic acid (0.2 ml.). The rotation of the solution fell from $[\alpha]_D +60°$ to $[\alpha]_D -35°$ in 80 min., and then remained unchanged. After 2 hrs. the solution was poured into water, and the precipitated product (560 mg.) $[\alpha]_D$ −79.4° (CHCl$_3$) was collected by filtration, washed with water, dried, and recrystallised from ethyl acetate, to give the 16-methylene-compound (365 mg., 61%), M.P. 179–182°, $[\alpha]_D$ −80.4° (c, 1.52 in CHCl$_3$).

*Example 18*

(A) PREPARATION OF 3β-ACETOXY-17α-HYDROXY-16-METHYL-5α-PREGNA-9(11),15-DIEN-20-ONE (i) 3β - acetoxy - 16α,17α-epoxy-16β-methyl-5α-pregn-9(11)-en-20-one (1.0 g.) in methanol (20 ml.) and methylene chloride (11 ml.) was treated with hydrogen bromide in acetic acid (3.2 N; 1.0 ml.). The rotation fell from $\alpha_D$=+2.0 to $\alpha_D$=−1.25 in 22 hrs., and remained steady for a further 2 hrs. The solution was then shaken with water (200 ml.) and methylene chloride (50 ml.), and the aqueous layer was extracted with more methylene chloride (3×10 ml.). The combined methylene chloride extracts were washed with aqueous sodium hydrogen carbonate and water and dried over magnesium sulphate. Removal of the solvent from the dried extract in vacuo left a residue (922 mg.), $[\alpha]_D$ −59.5° (c, 0.86 in CHCl$_3$) which, from its infrared spectrum, contained ca. 40% of 3β-acetate.

The solid was heated at 100° for 30 min. in dry pyridine (10 ml.) and acetic anhydride (10 ml.), and the mixture was poured into ice-water (200 ml.). The precipitated product (952 mg.), M.P. 158–166°, $[\alpha]_D$ −55° (c, 0.99 in CHCl$_3$) was collected by filtration. Crystallisation of part (800 mg.) from ethyl acetate gave needles (516 mg.) of 3β - acetoxy-17α-hydroxy-16-methyl-5α-pregna-9(11),15-dien-20-one, M.P. 179–182°, $[\alpha]_D$ −63.5° (c, 0.93 in CHCl$_3$), containing some of the 16-methylene isomer.

(ii) 16α,17α - epoxy-3β-hydroxy-16β-methyl-5α-pregn-9(11)-en-20-one (5.0 g.) was treated as in the preceding experiment i to give, after acetylation, a crude product (5.824 g.), $[\alpha]_D$ −33° (CHCl$_3$).

Crystallisation from ethyl acetate gave impure 16-methyl-$\Delta^{15}$-compound in two crops, the first crop (3.30 g.) having M.P. 179–182°, $[\alpha]_D$ −64.3° (c, 1.5 in CHCl$_3$), $[\alpha]_D$ −43.5° (c, 2.0 in dioxan), and the second crop (573 mg.), M.P. 178–182°, $[\alpha]_D$ −64.1° (c, 1.92 in CHCl$_3$). The mother liquor material was separated into hexane-insoluble (460 mg.) and hexane-soluble (1.2 g.) fractions. The insoluble fraction crystallised from methanol to give purer 16-methyl-$\Delta^{15}$-compound (200 mg.), $[\alpha]_D$ −60.6° (c, 1.56 in CHCl$_3$).

The impure 16-methyl-$\Delta^{15}$-compound (3.0 g.) from the first crop, containing some of the 16-methylene isomer, in solution in pure dioxan (150 ml.) was treated with boron trifluoride etherate (3.0 ml.) at room temperature. During 75 min. the rotation of the solution changed steadily from $[\alpha]_D$ −42.5° to $[\alpha]_D$ −28°, and was continuing to rise. D-homoannulation of the 16-methylene compound is complete under these conditions. The solution was then poured into ice-water (1200 ml.), and after 2 hrs. the precipitated product (2.91 g.), $[\alpha]_D$ −42° (CHCl$_3$) was collected by filtration, washed with water, and dried. One crystallisation from hexane (1000 ml. conc. to 400 ml.) gave the 16-methyl-$\Delta^{15}$-compound as needles (1.98 g.), M.P. 182–184°, $[\alpha]_D$ −63° (c, 1.24 in CHCl$_3$). Further crystallisations from hexane, then from methanol gave the analytical sample (1.10 g.), M.P. 183.5–185°, $[\alpha]_D$ −61–4° (c, 1.22 in CHCl$_3$) (found: C, 75.0; H, 9.0; C$_{24}$H$_{34}$O$_4$ requires C, 74.6; H, 9%).

(B) HYDROGENATION OF 3β-ACETOXY-17α-HYDROXY-16-METHYL-5α-PREGNA-9(11),15-DIEN-20-ONE

*With a platinum catalyst.*—The 16-methyl-9(11),15-dienone obtained as in (A) above (149 mg.) in ethyl alcohol (15 ml.) was hydrogenated over a pre-reduced Adams' catalyst (15 mg.) in the usual way. The uptake of hydrogen ceased at ca. 0.86 mol. The product was worked up in the usual way to give a white solid, $[\alpha]_D$ +25° (c, 1.2 in dioxan) which was crystallised twice from pyridine and then from aqueous methanol to give a mixture, $[\alpha]_D$ +26.5° (c, 1.73 in dioxan) containing approximately 75% of 3β-acetoxy-17α-hydroxy-16β-methyl-5α-pregn-9(11)-en-20-one.

*Example 19*

HYDROGENATION OF 3β - ACETOXY-17α-HYDROXY-16-METHYLENE - 5α - PREGN-9(11)-EN-20-ONE WITH A PLATINUM CATALYST AND CONVERSION OF THE PRODUCT TO 9α,11β-DICHLORO-3β,17α-DIHYDROXY-16β-METHYL-5α-PREGNAN-20-ONE

The 16-methylene-compound (recrystallised; 20 g.) in ethanol (1 l.) was hydrogenated in presence of Adams' catalyst (1.37 g.) by the method described in Example 14. The crude product (19.8 g.) had $[\alpha]_D$ +28.7° (c, 1.81 in dioxan).

A portion (6.3 g.) of this material was treated, in methanol (186 ml.), with a solution of potassium bicarbonate (3.88 g.) in water (76 ml.). The mixture was boiled under reflux for 4.5 hrs., diluted with water (250 ml.), cooled, and filtered. The solid weighted 5.26 g. and had $[\alpha]_D$ +30.1° (dioxan).

A portion (3.0 g.) of this material, in acetic acid (300 ml.), was treated with a solution of chlorine (1:1 molar equivalents) in carbon tetrachloride. The mixture was left in the dark for 5 minutes, while nitrogen was passed through. Aqueous sodium acetate (1%; 100 ml.) was added and the mixture was poured into 1% aqueous sodium acetate (900 ml.). The mixture was stored in the refrigerator overnight, filtered, washed with water, and dried at 50° in vacuo. The product (3.12 g; $[\alpha]_D$ +68.9° in dioxan) was crystallised from chloroform to give the pure 9α,11β-dichloro-3β,17α-diol (2.34 g.) M.P. 192–194°, $[\alpha]_D$+75° (c, 0.5 in dioxan).

We claim:

1. A process for the preparation of a product which is a 17α-hydroxy-16-methyl-20-keto allopregnane in which the 16β-methyl isomer predominates, which process comprises contacting a 16:17-epoxy-16β-methyl-20-keto allopregnane with an acid catalyst in a substantially anhydrous solvent medium of low ionising power to rearrange said last-mentioned compound to produce a mixture of 16-methylene- and $\Delta^{15}$-compounds in which the 16-methylene compound is in excess and hydrogenating said mixture in the presence of a catalyst selected from the group consisting of a platinum hydrogenation catalyst and a Raney nickel catalyst to produce said product.

2. A process as claimed in claim 1 in which said solvent medium is an ether.

3. A process as claimed in claim 2 in which said solvent medium is a cyclic ether.

4. A process as claimed in claim 2 in which the solvent is selected from the group consisting of dioxan, tetrahydrofuran, diethyl ether and di-isopropyl ether.

5. A process as claimed in claim 1 in which the product of rearrangement is fractionally crystallised to separate the 16-methylene compound therefrom, which compound is then subjected to hydrogenation.

6. A process as claimed in claim 1 in which the acid catalyst is a strong acid.

7. A process as claimed in claim 6 in which said acid is selected from the group consisting of hydrogen bromide, hydrogen chloride, sulphuric acid, perchloric acid and formic acid.

8. A process as claimed in claim 1 in which the hydrogenation catalyst is selected from the group consisting of platinum metal, platinum supported on charcoal and platinum supported on silica.

9. A process as claimed in claim 8 in which the hydrogenation is carried out under non-alkaline conditions.

10. A process as claimed in claim 1 in which the hydrogenation catalyst is Raney nickel and the hydrogenation is carried out under basic conditions.

11. A process as claimed in claim 1 in which the 16:17-epoxy steroid is selected from the group consisting of a compound having the formula

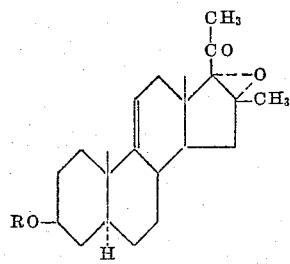

and a compound having the formula

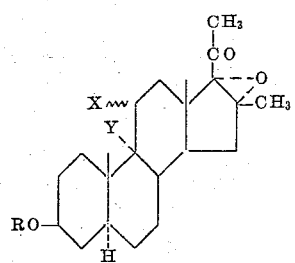

where R is selected from the group consisting of hydrogen and an acyl group, X is selected from the group consisting of a keto, acyloxy, hydroxy and chloro group, and Y is selected from the group consisting of hydrogen and chlorine atoms.

12. A process as claimed in claim 1 in which said 16:17-epoxy steroid is obtained by reaction of the corresponding $\Delta^{16}$-steroid with hydrogen peroxide under alkaline conditions.

13. A process for the preparation of a mixture of a 17α-hydroxy-16-methylene-20-keto allopregnane and a 17α-hydroxy-16-methyl-20-keto-$\Delta^{15}$-allopregnane in which the 16-methylene compound is in excess, which process comprises contacting a 16:17-epoxy-16β-methyl-20-keto allopregnane with a substantially anhydrous mixture of an acid catalyst and a solvent medium of low ionising power to rearrange said last-mentioned compound.

14. A process for the preparation of a product which is a 17α-hydroxy-16-methyl-20-keto allopregnane in which the 16β-methyl isomer predominates, which process comprises hydrogenating a mixture of a 17α-hydroxy-16-methylene-20-keto allopregnane and a 17α-hydroxy-16-methyl-20-keto-$\Delta^{15}$ allopregnane in which the 16-methylene compound is in excess in the presence of a catalyst selected from the group consisting of a platinum hydrogenation catalyst and a Raney nickel catalyst.

References Cited in the file of this patent
UNITED STATES PATENTS 2,954,386   Beyler _____ Sept. 27, 1960

OTHER REFERENCES

Shoppee: "Chemistry of the Steroids," Butterworths Scientific Publications (1958), pp. 247 and 249.
Nomine et al.: Tetrahedron 8, 217–220 (1960).